Dec. 9, 1930.  F. L. MORSE  1,784,023

DRIVE CHAIN

Filed May 8, 1930

FRANK L. MORSE  INVENTOR.

BY Robert V. Morse

ATTORNEY.

Patented Dec. 9, 1930

1,784,023

UNITED STATES PATENT OFFICE

FRANK L. MORSE, OF ITHACA, NEW YORK

DRIVE CHAIN

Application filed May 8, 1930. Serial No. 450,655.

This invention relates in general to chains used for the transmission of power, and is particularly applicable to chains of the silent type such as are extensively used in the front end or cam shaft drives of automobiles, for example. Various means have been used to guide such chains on their sprockets so that they will not run off sideways. One of the methods which has proved most satisfactory has been the use of "guide links" consisting of special link plates running in grooves cut peripherally around the sprocket thru the sprocket teeth. Another method has been the use of special side plates or guide links on the outer edges of the chain, so that the sprocket teeth ran between them. In any case the guide links have heretofore been arranged symmetrically, that is to say, with either a single set of guide links running down the middle of the chain, or if more than one set, symmetrically arranged with respect to the center.

The present invention is characterized by a non-symmetrical arrangement of the guide links with respect to the center line of the chain, an improvement which results in several marked advantages as will be described in detail later; for the present it will suffice to state that it insures that a chain designed to run in one direction will not be put on backwards, gives a stronger sprocket where there are cantilever loads, prevents a chain being put on a sprocket not designed for it, and permits a better application of load against the guide link under running conditions.

In the drawings, Fig. 1 is a side elevation partly in section of a sprocket and chain embodying this invention;

Figure 1:
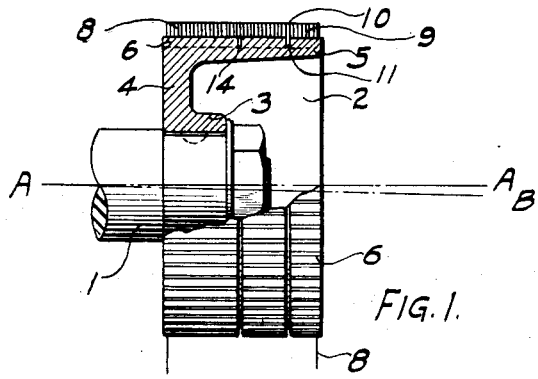
Figure 2:
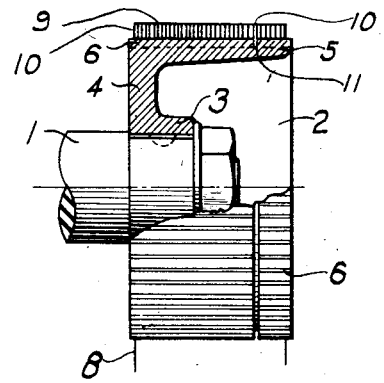
Fig. 2 is a similar view showing a modification.
Figure 3:
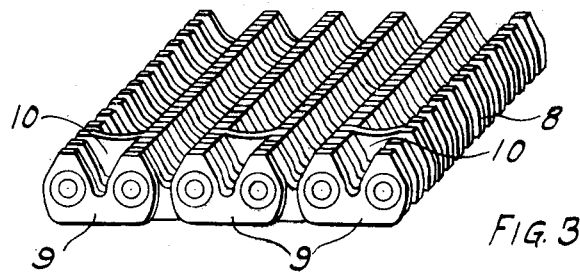
Fig. 3 is a perspective view of a short length of chain embodying the invention, showing the offset guide links.

Referring first to Fig. 1 and Fig. 2, there is shown mounted on the shaft 1 a sprocket wheel 2, having a hub 3, spokes or web 4, and a peripheral or rim portion 5 in which are cut the sprocket teeth 6. The spoke or web portion 4 is shown offset so that the rim portion 5 overhangs the hub 3,—a construction that is often found in automobile and other installations where compactness is desirable. Running over and engaging the sprocket teeth 6 is a power chain 8 having arch shaped links 9 engaging the sprocket teeth 6 and guide links 10 running in a groove or series of notches 11 cut in the sprocket teeth 6, this channel 11 usually being termed the guide groove. The driving link plates 9 and guide link plates 10 are shown more clearly in Fig. 3, which illustrates a short length of a typical chain embodying the present invention.

It has always been customary to arrange the guide grooves symmetrically on a sprocket wheel, either with a single guide groove in the middle of the wheel, or if more than one groove there have been as many to the right as to the left of the center. It has thus been possible to put a chain on backwards on a sprocket wheel, and this has caused trouble, as many types of chain are designed to run better in one direction than the other. The present invention is distinguished from the usual form in that the guide links do not divide the chain symmetrically, but are placed more to one side than the other, or at least are arranged so that the two sides are different. For example, in Fig. 1 and Fig. 2 the guide links 10 are located more to the right than to the left, insuring that the chain will be put on the wheel as designed. In Fig. 1 there is also a central guide groove 14, so that the sprocket can mate with a chain of the ordinary type if necessary; but the construction illustrated in Fig. 2 is generally preferable, to insure that the sprocket will only be fitted with chains especially designed for it. In either case, if the chain is provided with a non-symmetrical arrangement of guide links as contemplated by this invention, it can only be put on the sprocket in one way.

With the overhung or dished type of sprocket as shown in Fig. 1 and Fig. 2, the presence of a guide groove or notch in the teeth has a tendency to weaken the sprocket under the cantilever stresses involved, especially when the groove was in the center, or equally spaced from the center, as in the prior constructions. Under the present invention, it will be noted that the more the guide groove 11 is displaced away from the point of support, as in Fig. 2, the less the structure is weakened, since the stresses in the metal build up as one approaches the point of support, so that a notch near the left side in Fig. 2 would be much more disadvantageous than a notch at the right. The offset guide link construction thus in many cases gives a stronger and lighter sprocket construction, and permits the metal to be more effectively utilized.

Another advantage of this offset guide link construction is the improved distribution of lateral loads within the chain. Referring for example to Fig. 1, the normal center line of the shaft 1 when the chain is not under load is indicated by the line A—A and it will be understood that when the chain drive is running and under load, as for example pulling downward in Fig. 1, the shaft 1 is slightly deflected as indicated in an exaggerated form by the line A—B. This creates a tendency for all the links to pull off to the right, a tendency which is resisted by the guide links 10. If the guide links are in the middle, the lateral load from all the link plates on the left of the guide link would push directly against the guide link, but the lateral load from the link plates on the right of the guide link would be away from the guide link and would be first transmitted to the rivet or washer on the right hand side of the chain, thence to the pintle pin running thru the chain to the rivet and washer on the left hand side of the chain, and from that thru the link plates on the left hand side of the chain to the guide link. Thus the old arrangement puts unnecessary and undesirable loads on the rivets and washers, which are weak points in chain construction. When the guide links are displaced to the right, as in Fig. 1 and Fig. 2, the bulk of the lateral load bears directly against the guide link, leaving a relatively small proportion to be transmitted from the link plates on the right thru the pins and rivets as described.

Figure 4:
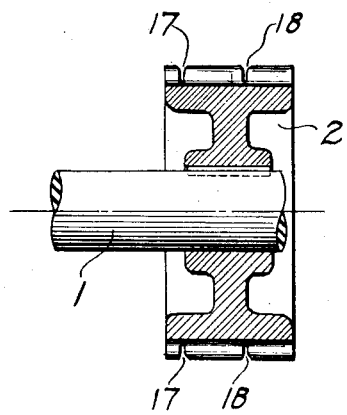
Fig. 4 is a cross-section of a sprocket showing another modification.

While the invention is especially advantageous with overhung sprockets, as in Fig. 1 and Fig. 2, it is also generally applicable to any other type of sprocket wheel, and there may be also one, two, or three or more guide grooves, provided only that they are not symmetrically arranged. For example, in Fig. 4 there are shown two guide grooves 17 and 18, at different distances to the right and left of the center.

While in the foregoing I have described certain specific examples, it will be understood that they are merely for purposes of illustration to make clear the principles of the invention, which is not limited to the particular forms shown, and is susceptible to various modifications and adaptations in different installations as will be apparent to those skilled in the art, without departing from the scope of the invention as stated in the following claims.

I claim:

1. In power transmission chain drives comprising toothed sprocket wheels and multiplate chains retained thereon laterally by guide links, the method of controlling the installation of said chains which consists in locating the guide links non-symmetrically with respect to the center line of the chain.

2. A power transmission chain, comprising in combination driving links and guide links, with the guide links non-symmetrically located with respect to the center line of the chain.

3. A power transmission chain, comprising in combination driving links and guide links, the guide links dividing the driving links laterally into groups, the groups on one side of the center line of the chain being different than the groups on the other side of the center line of the chain.

4. In a chain drive, the combination of a sprocket having a guide groove and a chain having corresponding guide links, the guide links being offset laterally with respect to the center line of the chain so that the part of the chain on one side of the center line differs from the part on the other side.

5. In a chain drive, a dished sprocket having an offset guide groove, said groove being located nearer the overhanging edge of the sprocket than the other edge, so as to effect a more advantageous distribution of stresses.

In testimony whereof I have hereunto signed my name this 6th day of May, 1930.

FRANK L. MORSE.